US012745767B2

(12) United States Patent
Wang et al.

(10) Patent No.: US 12,745,767 B2
(45) Date of Patent: Sep. 29, 2026

(54) HYPOTHERMIC OXYGENATED PERFUSION SOLUTION FOR REPAIRING KIDNEY INJURY AND USE THEREOF

(71) Applicant: WUHAN UNIVERSITY, Wuhan (CN)

(72) Inventors: Yanfeng Wang, Wuhan (CN); Peng Zhang, Wuhan (CN); Chao Sun, Wuhan (CN); Shuyong Mo, Wuhan (CN)

(73) Assignee: WUHAN UNIVERSITY, Wuhan (CN)

( * ) Notice: Subject to any disclaimer, the term of this patent is extended or adjusted under 35 U.S.C. 154(b) by 531 days.

(21) Appl. No.: 18/341,811

(22) Filed: Jun. 27, 2023

(65) Prior Publication Data

US 2024/0172744 A1 May 30, 2024

(30) Foreign Application Priority Data

Nov. 30, 2022 (CN) ......................... 202211515265.6

(51) Int. Cl.

*A01N 1/02* (2006.01)
*A01N 1/126* (2025.01)
*A01N 1/143* (2025.01)
*A01N 1/162* (2025.01)

(52) U.S. Cl.

CPC ............. *A01N 1/143* (2025.01); *A01N 1/126* (2025.01); *A01N 1/162* (2025.01)

(58) Field of Classification Search

CPC ........ A01N 1/143; A01N 1/126; A01N 1/162; A01N 1/122

See application file for complete search history.

(56) References Cited

FOREIGN PATENT DOCUMENTS

CN 213099890 U 5/2021

OTHER PUBLICATIONS

Bhattacharjee et al. Renal protection against ischemia reperfusion injury: hemoglobin-based oxygen carrier-201 versus blood as an oxygen carrier in ex vivo subnormothermic machine perfusion, Transplantation, 104(3), pp. 482-489, 2020 (Year: 2020).*

Bhattacharjee et al. CORM-401 reduces ischemia reperfusion injury in an ex vivo renal porcine model of the donation after circulatory death. Transplantation, 102(7), pp. 1066-1074. (Year: 2018).*

* cited by examiner

*Primary Examiner* — Jeremy C Flinders
*Assistant Examiner* — Masudur Rahman
(74) *Attorney, Agent, or Firm* — Bayramoglu Law Offices LLC

(57) ABSTRACT

A hypothermic oxygenated perfusion solution for repairing kidney injury and use thereof belongs to the technical field of medical treatment. The hypothermic oxygenated perfusion solution is an organ preservation solution carrying carbon monoxide-releasing molecules. The hypothermic oxygenated perfusion solution can significantly increase the perfusion flow of the kidney, reduce the intrarenal resistance and significantly improve the histopathological integrality. The hypothermic oxygenated perfusion solution is provided for specifically repairing the kidney from donation after circulatory death donors, and has a huge application prospect for clinical transformation.

1 Claim, 3 Drawing Sheets

HYPOTHERMIC OXYGENATED PERFUSION SOLUTION FOR REPAIRING KIDNEY INJURY AND USE THEREOF

CROSS REFERENCE TO THE RELATED APPLICATIONS

This application is based upon and claims priority to Chinese Patent Application No. 202211515265.6, filed on Nov. 30, 2022, the entire contents of which are incorporated herein by reference.

TECHNICAL FIELD

The present invention relates to the technical field of medical treatment, and in particular to a hypothermic oxygenated perfusion solution for repairing kidney injury and use thereof.

BACKGROUND

Kidney transplantation is the most effective means to improve the quality of life and health status of patients with end-stage renal disease. The number of patients on the waiting list for kidney transplantation has increased with time worldwide; however, the sources of organs are in short supply and the requirements of organ transplantation are far from being met. The number of potential donors from the donation after brain death and living organ donations has grown slowly. Therefore, the organs from donation after circulatory death donors have given serious cause for concern and are considered to be the leading method for expanding the sources of donor organs. According to the overview of global organ donation and transplantation in 2020, the proportion of the number of donation after circulatory death donors in all the organ donors in each country is greatly different, with about 17.1%-80% or more, and the main reason for inconsistent utilization rate of donation after circulatory death donor-derived organs is that compared with the standard donors, the quality of the kidney from the donation after circulatory death donor is poor, and due to the concerns on serious complications after transplantation, most of the kidneys from the donation after circulatory death donors are rejected for use in clinical transplantation, further exacerbating the shortage of organs.

The main factors causing high discard rate of the kidneys from the donation after circulatory death donors are warm ischemic injury; and the ischemia/hypoxia of organs causes anaerobic metabolism and acidosis of cells, thereby promoting the injury and the death of renal tubular epithelial cells and vascular endothelial cells. The kidney with a warm ischemic injury cannot avoid being subjected to cold ischemic injury in the cold storage process of organs, thereby exacerbating the damage to the quality and function of the organs without doubt. The kidneys from the donation after circulatory death donors, after being subjected to two injuries, are more easily subjected to ischemia-reperfusion injury, so that the recovery of the function of the transplanted kidney is delayed, and the incidence rate of primary non-function of the transplant and acute rejection greatly increases.

With the continuous improvement in the organ preservation solution and the emergence of novel organ machine perfusion preservation technology, the possibility is provided for changing the current situation that kidneys from the donation after circulatory death donors are discarded due to limited organ maintenance and preservation technology. The hypothermic oxygenated perfusion technology can effectively realize dynamic preservation of organs ex-vivo at a low temperature while maintaining certain energy metabolism, and alleviate mitochondrial energy metabolism disorder and the generation of a large amount of reactive oxygen species caused by ischemia/hypoxia under traditional static cold storage. Multiple retrospective and prospective clinical control studies all demonstrated that the preservation of kidneys from donation after circulatory death donors and kidneys from expanded criteria donors and the effect after kidney transplantation using hypothermic oxygenated perfusion were significantly superior to the traditional static cold storage. At present, the hypothermic oxygenated perfusion technology is applied in most kidney transplantation as a simple, safe and effective organ preservation means. Although the number of kidneys from donation after circulatory death donors used for transplantation increases, fundamental contradiction between supply and demand of organs is not solved, and the main reason is that the hypothermic oxygenated perfusion technology has a definite effect on repairing the kidneys from controllable donation after circulatory death donors with the withdrawal of the life support system and the precognition about donation after circulatory death in a hospital, and has a limited effect on repairing the kidneys from uncontrollable donation after circulatory death donors without knowing the occurrence time of a cardiac death in advance, but most of the potential donor kidneys capable of expanding a donor pool are derived from the kidneys from uncontrollable donation after circulatory death donors. Thus, a greater challenge is provided for the existing organ machine perfusion technology and the perfusion solution.

The use of the hypothermic oxygenated perfusion technology in the kidneys from donation after circulatory death donors is becoming more mature, and it has been reported that about 10 donated kidneys per day are discarded for fear of the occurrence of serious complications after transplantation. The main reason is that different types of organ preservation solutions as hypothermic oxygenated perfusion solutions are not developed aiming at the pathophysiological state design of the kidneys from donation after circulatory death donors, and there is no perfusion fluid capable of recovering the smoothness of the microcirculation of the kidney from donation after circulatory death donors during the machine perfusion, resisting inflammation and resisting apoptosis. The hypothermic perfusion preservation solution at present has a certain potential effect on preventing and relieving the cold ischemic injury after the warm ischemic injury of the kidneys from donation after circulatory death donors, but the quality of the donor kidney cannot be fundamentally improved. Another important reason is that the ischemia/hypoxia induces the dysfunction of renal cortices and medullar veins, and persistent contraction and spasm are found, resulting in insufficient machine perfusion areas ex-vivo, and the perfusion fluid cannot be distributed evenly in each area of the kidney, and thus cannot play a role in organ protection and removal of metabolic waste.

In view of the above, the present invention is proposed.

SUMMARY

The present invention aims to provide a hypothermic oxygenated perfusion solution for repairing kidney injury and use thereof.

In order to achieve the above objective, the present invention provides the following Technical Solutions.

The present invention provides a hypothermic oxygenated perfusion solution for repairing kidney injury, wherein the hypothermic oxygenated perfusion solution is an organ preservation solution carrying carbon monoxide-releasing molecules.

Preferably, the carbon monoxide-releasing molecules are carbon monoxide-releasing molecules-2, carbon monoxide-releasing molecules-3 or carbon monoxide-releasing molecules-401.

Preferably, a final concentration of the carbon monoxide-releasing molecules-2 is 50-800 μM.

Preferably, a final concentration of the carbon monoxide-releasing molecules-3 is 50-800 μM.

Preferably, a final concentration of the carbon monoxide-releasing molecules-401 is 20-800 μM.

Preferably, the organ preservation solution includes a Histidine-Tryptophan-Ketoglutarate (HTK) solution, a Kidney-Perfusion-Solution-1 (KPS-1), or a University of Wisconsin (UW) solution.

The present invention also provides use of the hypothermic oxygenated perfusion solution for the repair of kidney injury.

Preferably, the kidney injury is an injury caused by ischemia/hypoxia during kidney transplantation.

Preferably, a method for repairing the injury caused by ischemia/hypoxia during kidney transplantation by the hypothermic oxygenated perfusion solution includes: placing the hypothermic oxygenated perfusion solution in a hypothermic oxygenated perfusion system to carry out ex-vivo perfusion on a kidney.

The present invention provides a hypothermic oxygenated perfusion solution for repairing kidney injury and use thereof. The hypothermic oxygenated perfusion solution of the present invention can effectively regulate the vascular function of the kidney from a donation after circulatory death donor and relieve the injury caused by ischemia/hypoxia, has significant repairing and improving effects on improving the kidney quality, and has a huge application prospect for clinical transformation.

Carbon monoxide is an important endogenous gas molecule, is one of important endogenous protection mechanisms of cells in a stress state, and can relieve ischemia-reperfusion injury by playing the roles of resisting oxidative stress, resisting inflammation, resisting apoptosis and the like. Most importantly, the carbon monoxide has good vascular regulation and protection functions and has a wide clinical application prospect on the recovery of the physiological activity and the function regulation of the kidneys from donation after circulatory death donors. The carbon monoxide poisoning risk caused by the combination of carbon monoxide and hemoglobin exists in the carbon monoxide therapy applied ex vivo and the carbon monoxide therapy applied in the normothermic machine perfusion based on red blood cells, and thus the carbon monoxide poisoning risk is also a main reason for limiting the application of carbon monoxide clinical transformation. The carbon monoxide released by the carbon monoxide-releasing molecules has the capabilities of relaxing spastic blood vessels, resisting oxidative stress, resisting inflammation and resisting apoptosis, and effectively plays roles in repairing of and protecting from the injury of kidneys from donation after circulatory death donors. In the present invention, the carbon monoxide-releasing molecules are released into the organ preservation solution in a controllable and sustained manner, the side effects caused by the combination of carbon monoxide and red blood cells can be avoided, a possibility is provided for clinical application, kidney injury is reduced, the quality of the transplant is improved and the contradiction between supply and demand of organs is relieved.

In the present invention, the carbon monoxide-releasing molecules are added into the organ preservation solution to improve the hypothermic oxygenated perfusion solution, and the carbon monoxide is continuously released to play its roles of vasodilation and resistance to ischemia/hypoxia injury, so that the kidney can maintain good and stable perfusion parameters and functional states in the ex-vivo perfusion process.

In the present invention, the perfusion flow of the kidney can be effectively increased and the intrarenal resistance can be reduced, which does not depend on the hypothermic oxygenated perfusion or the vasodilation effect of carbon monoxide alone, and however, the two effects are organically combined to play the complementary result. After a cardiac death, diffuse thrombosis in blood vessels and injury and contraction of vascular endothelial cells are reasons for hindering the effect of machine perfusion, however, carbon monoxide can effectively promote the vasodilation in microcirculation, so that the hypothermic oxygenated perfusion simulates the liquid flow in normal blood vessels to effectively flush out thrombus in the blood vessels in microcirculation, the whole organs are effectively perfused and metabolic wastes are removed, and meanwhile, oxygen and carbon monoxide can be smoothly delivered to renal tissues, and the function and vitality of the kidney from a donation after circulatory death donor can be more effectively recovered.

In the process of hypothermic oxygenated perfusion, since the organ is perfused ex-vivo, the perfusion fluid can be completely flushed out of the organ before transplantation, and the residual carbon monoxide-releasing molecules in the kidney can be effectively removed, the treatment protocol of the present invention cannot bring the risk of carbon monoxide poisoning of a transplant recipient.

In conclusion, adding the carbon monoxide-releasing molecules into the perfusion fluid can realize the regulation of the vasomotor function of the kidney and improve the effective perfusion of various areas of the kidney. Compared with the current general organ preservation solution, the hypothermic oxygenated perfusion solution of the present invention has a breakthrough technical effect and makes a substantial contribution to the existing preservation and repair technology for organs from donation after circulatory death donors.

BRIEF DESCRIPTION OF THE DRAWINGS

FIGS. 2A-2D are graphs showing change curves of intrarenal resistance during the perfusion of the hypothermic oxygenated perfusion solution of the present invention on the kidney at different times after a cardiac death (wherein FIG. 2A shows Example 1, FIG. 2B shows Example 2, FIG. 2C shows Example 3, and FIG. 2D shows Example 4, wherein the horizontal coordinate is time and the vertical coordinate is intrarenal resistance).

FIGS. 3A-3D show the change of renal tissues after 2 h of perfusion treatment of the kidney with the hypothermic oxygenated perfusion solution of the present invention at different times of cardiac death (wherein FIG. 3A shows Example 1, FIG. 3B shows Example 2, FIG. 3C shows Example 3, and FIG. 3D shows Example 4).

DETAILED DESCRIPTION OF THE EMBODIMENTS

Figure 1:
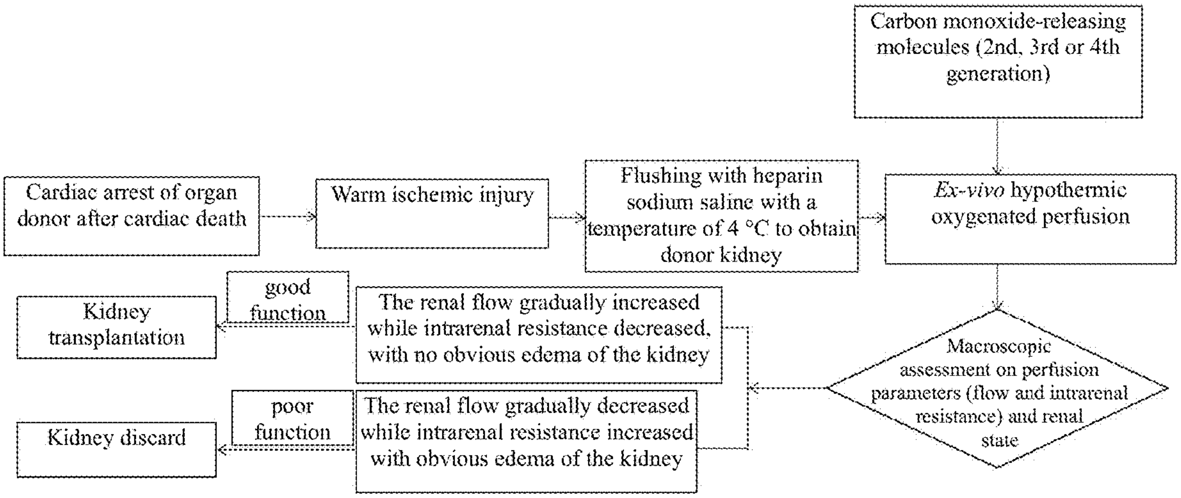
FIG. 1 is a flowchart of a method for using a hypothermic oxygenated perfusion solution.

The present invention provides a hypothermic oxygenated perfusion solution for repairing kidney injury, wherein the hypothermic oxygenated perfusion solution is an organ preservation solution carrying carbon monoxide-releasing molecules.

In the present invention, the carbon monoxide-releasing molecules are carbon monoxide-releasing molecules-2, carbon monoxide-releasing molecules-3 or carbon monoxide-releasing molecules-401.

In the present invention, the carbon monoxide-releasing molecules-2 and the carbon monoxide-releasing molecules-3 are carbon monoxide-metal complexes of ruthenium; the carbon monoxide-releasing molecules-401 are carbon monoxide-metal complexes of manganese.

In the present invention, a final concentration of the carbon monoxide-releasing molecules-2 is 50-800 μM.

In the present invention, a final concentration of the carbon monoxide-releasing molecules-3 is 50-800 μM.

In the present invention, a final concentration of the carbon monoxide-releasing molecules-401 is 20-800 μM.

In the present invention, the organ preservation solution includes an HTK solution, a KPS-1 solution, or an UW solution.

The present invention also provides use of the hypothermic oxygenated perfusion solution for the repair of kidney injury.

In the present invention, the kidney injury is an injury caused by ischemia/hypoxia during kidney transplantation.

In the present invention, a method for repairing the injury caused by ischemia/hypoxia during kidney transplantation by the hypothermic oxygenated perfusion solution includes: placing the hypothermic oxygenated perfusion solution in a hypothermic oxygenated system to carry out ex-vivo perfusion on a kidney.

The technical schemes provided in the present invention will be described in detail below with reference to the examples, which, however, should not be construed as limiting the scope of the present invention.

Before the examples of the present invention, the inventor consults the literature to find that the pure hypothermic oxygenated perfusion of the kidney ex-vivo can repair the function of the kidney from a donation after circulatory death donor to a certain extent, and the ex-vivo evaluation mainly and preliminarily determines the function, the state and the availability of the organ through good and stable perfusion parameters during the ex-vivo perfusion. For the donor kidney with prolonged ischemia time and serious injury degree, the inventor finds that the hypothermic oxygenated perfusion in which the existing general organ preservation solution such as an HTK solution, a KPS-1 solution or an UW solution is adopted cannot effectively recover the patency of the microcirculation of the kidney and increase the intrarenal blood flow, and in addition, the injury of the renal tissue structure will be aggravated due to uneven perfusion along with the prolongation of the perfusion time, which is mainly reflected in that the perfusion flow of the kidney is reduced, the edema degree of the renal tissues is increased, the intrarenal resistance is increased, and the kidney can only be discarded finally.

Previous studies have also shown that the optimal condition for the sustained release of effective concentrations of carbon monoxide by carbon monoxide-releasing molecules is at a physiological temperatures of 37° C., the low-temperature environment required for organ preservation will result in a decrease in the release amount of carbon monoxide. The inventor finds that in the process of hypothermic machine perfusion, the continuous supply of oxygen will effectively increase the release amount of carbon monoxide from the carbon monoxide-releasing molecules. In addition, the effect of increasing the release amount of carbon monoxide can also be achieved by increasing the concentration of carbon monoxide-releasing molecules in the hypothermic oxygenated perfusion solution. The above two modes can effectively play the protection role of carbon monoxide in the hypothermic oxygenated perfusion of the kidney.

The method for performing hypothermic oxygenated perfusion on a kidney from a donation after circulatory death donor of a rat by using the perfusion fluid according to the examples of the present invention specifically includes the following steps: for a donor organ donated after a cardiac death, in the kidney acquisition process, performing in-situ organ lavage by using heparin sodium saline with a temperature of 4° C. to effectively remove thrombus in large blood vessels and to relieve the obstacle of the thrombus to the delivery of carbon monoxide released by carbon monoxide-releasing molecules to the kidney, combining ex-vivo hypothermic oxygenated perfusion with the carbon monoxide released by the carbon monoxide-releasing molecules to specifically achieve the vasodilation, the removal of microthrombus and the recovery of the patency of the microcirculation, and evaluating the function and quality of the kidney through perfusion parameters (perfusion flow and intrarenal resistance) and a macroscopic kidney state, wherein the perfusion parameters can reflect the kidney function to a certain degree; a kidney with a good function can be subjected to allogeneic kidney transplantation and a kidney with a poor function will be discarded. The flowchart is shown in FIG. 1.

EXAMPLE 1

SPF healthy male rats from Wistar with the weight of 300-350 g were selected and fasted (water was accessible) for 12 h before the day of operation. After 2% pentobarbital sodium was injected into the abdominal cavity of the rat for anesthesia, the rat was fixed onto an operating table in a supine position during anesthetization, the abdominal hair was removed by a shaver, the operating area was sterilized with iodophor, and a sterile surgical drape was laid. A crisscross incision was made on the abdomen of the rat with a scalpel, then the skin, muscular layer and peritoneum thereof were incised layer-by-layer, the left kidney and the large blood vessels in the abdominal cavity were fully dissociated and exposed, and the surrounding tissues and organs were covered with a gauze soaked in warm saline. The left renal arteries and veins were separated by using cotton swabs and a toothless forceps of a microscope, dissociated and placed to the initial part of left renal arteries and veins, and then the left kidney, the renal arteries, aortae, inferior vena cava and left ureter were dissociated and placed to silk threads for later use in ligation.

The bilateral diaphragm muscles were cut to induce cardiac arrest, the thoracic aorta was ligated to block blood circulation, the abdominal cavity was closed and covered with a sterile wet gauze, and the warm ischemia time was calculated. The renal warm ischemia time was 30 min, and the temperature of the abdominal cavity was maintained at 37° C. by a constant heating pad. At the end of warm ischemia, sterile ice saline was added to the abdominal cavity to rapidly lower the temperature of the abdominal cavity. The abdominal aorta and the inferior vena cava above the left kidney were ligated, then the blood of the left kidney was irrigated through an abdominal aorta cannula by using 8 mL of heparin sodium saline with a temperature of 4° C., a laceration was cut on the inferior vena cava, after the blood flowed out to be clear, 10 mL of organ preservation solution, a KPS-1 solution with a temperature of 4° C., was poured through the abdominal aorta for flushing, and the kidney was fully dissociated, taken out and put into the organ preservation solution, the KPS-1 solution with a temperature of 4° C., for cold storage.

Figure 2A:
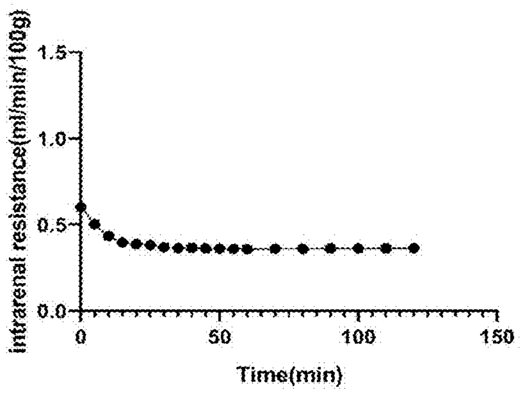

After the kidney was separated from the body of the rat, an organ perfusion pool and a perfusion pipeline were placed in an ice-water bath for hypothermic oxygenated perfusion through renal artery, renal vein and ureter cannulae and by improving the normal-temperature mechanical preservation and re-perfusion system for a kidney of a rat constructed by the previous Patent No. 202020639775.4 from the team. The kidney was placed into a kidney machine perfusion system for perfusion, carbon monoxide-releasing molecules-401 with a concentration of 200 μM were added into an organ preservation solution, a KPS-1 solution, and oxygen was introduced to perform the hypothermic oxygenated perfusion so as to relieve vasospasm and fully perfuse the kidney. The temperature was monitored in real time and controlled to be 0° C. to 4° C., the mean arterial pressure was monitored by a biological information acquisition system and controlled to be 30 mmHg, and after 2 h of the perfusion, perfusion parameters such as pressure, temperature and flow rate were continuously monitored and recorded. The change curves of intrarenal resistance during the perfusion of the hypothermic oxygenated perfusion solution on the kidney in combination with the perfusion of carbon monoxide-releasing molecules-401 at different times after a cardiac death are shown in FIG. 2A.

EXAMPLE 2

SPF healthy male rats from Wistar with the weight of 300-350 g were selected and fasted (water was accessible) for 12 h before the day of operation. After 2% pentobarbital sodium was injected into the abdominal cavity of the rat for anesthesia, the rat was fixed onto an operating table in a supine position during anesthetization, the abdominal hair was removed by a shaver, the operating area was sterilized with iodophor, and a sterile surgical drape was laid. A crisscross incision was made on the abdomen of the rat with a scalpel, then the skin, muscular layer and peritoneum thereof were incised layer-by-layer, the left kidney and the large blood vessels in the abdominal cavity were fully dissociated and exposed, and the surrounding tissues and organs were covered with a gauze soaked in warm saline. The left renal arteries and veins were separated by using cotton swabs and a toothless forceps of a microscope, dissociated and placed to the initial part of left renal arteries and veins, and then the left kidney, the renal arteries, aortae, inferior vena cava and left ureter were dissociated and placed to silk threads for later use in ligation.

The bilateral diaphragm muscles were cut to induce cardiac arrest, the thoracic aorta was ligated to block blood circulation, the abdominal cavity was closed and covered with a sterile wet gauze, and the warm ischemia time was calculated. The renal warm ischemia time was 45 min, and the temperature of the abdominal cavity was maintained at 37° C. by a constant heating pad. At the end of warm ischemia, sterile ice saline was added to the abdominal cavity to rapidly lower the temperature of the abdominal cavity. The abdominal aorta and the inferior vena cava above the left kidney were ligated, then the blood of the left kidney was irrigated through an abdominal aorta cannula by using 8 mL of heparin sodium saline with a temperature of 4° C., a laceration was cut on the inferior vena cava, after the blood flowed out to be clear, 10 mL of organ preservation solution, a KPS-1 solution with a temperature of 4° C., was poured through the abdominal aorta for flushing, and the kidney was fully dissociated, taken out and put into the organ preservation solution, the KPS-1 solution with a temperature of 4° C., for cold storage.

Figure 2B:
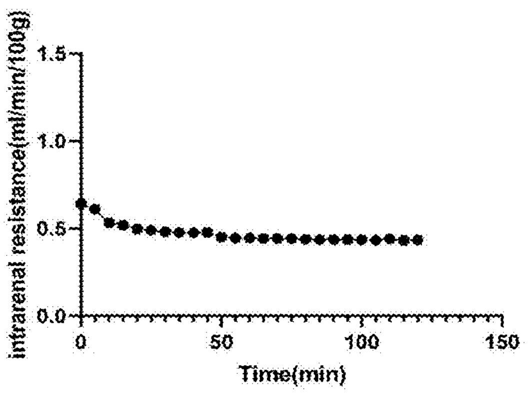

After the kidney was separated from the body of the rat, an organ perfusion pool and a perfusion pipeline were placed in an ice-water bath for hypothermic oxygenated perfusion through renal artery, renal vein and ureter cannulae and by improving the normal-temperature mechanical preservation and re-perfusion system for a kidney of a rat constructed by the previous Patent No. 202020639775.4 from the team. The kidney was placed into a kidney machine perfusion system for perfusion, carbon monoxide-releasing molecules-401 with a concentration of 400 μM were added into an organ preservation solution, a KPS-1 solution, and oxygen was introduced to perform the hypothermic oxygenated perfusion so as to relieve vasospasm and fully perfuse the kidney. The temperature was monitored in real time and controlled to be 0° C. to 4° C., the mean arterial pressure was monitored by a biological information acquisition system and controlled to be 30 mmHg, and after 2 h of the perfusion, perfusion parameters such as pressure, temperature and flow rate were continuously monitored and recorded. The change curves of intrarenal resistance during the perfusion of the hypothermic oxygenated perfusion solution on the kidney in combination with the perfusion of carbon monoxide-releasing molecules-401 at different times after a cardiac death are shown in FIG. 2B.

EXAMPLE 3

SPF healthy male rats from Wistar with the weight of 300-350 g were selected and fasted (water was accessible) for 12 h before the day of operation. After 2% pentobarbital sodium was injected into the abdominal cavity of the rat for anesthesia, the rat was fixed onto an operating table in a supine position during anesthetization, the abdominal hair was removed by a shaver, the operating area was sterilized with iodophor, and a sterile surgical drape was laid. A crisscross incision was made on the abdomen of the rat with a scalpel, then the skin, muscular layer and peritoneum thereof were incised layer-by-layer, the left kidney and the large blood vessels in the abdominal cavity were fully dissociated and exposed, and the surrounding tissues and organs were covered with a gauze soaked in warm saline. The left renal arteries and veins were separated by using cotton swabs and a toothless forceps of a microscope, dissociated and placed to the initial part of left renal arteries and veins, and then the left kidney, the renal arteries, aortae, inferior vena cava and left ureter were dissociated and placed to silk threads for later use in ligation.

The bilateral diaphragm muscles were cut to induce cardiac arrest, the thoracic aorta was ligated to block blood circulation, the abdominal cavity was closed and covered with a sterile wet gauze, and the warm ischemia time was calculated. The renal warm ischemia time was 60 min, and the temperature of the abdominal cavity was maintained at 37° C. by a constant heating pad. At the end of warm ischemia, sterile ice saline was added to the abdominal cavity to rapidly lower the temperature of the abdominal cavity. The abdominal aorta and the inferior vena cava above the left kidney were ligated, then the blood of the left kidney was irrigated through an abdominal aorta cannula by using 8 mL of heparin sodium saline with a temperature of 4° C., a laceration was cut on the inferior vena cava, after the blood flowed out to be clear, 10 mL of organ preservation solution, a KPS-1 solution with a temperature of 4° C., was poured through the abdominal aorta for flushing, and the kidney was fully dissociated, taken out and put into the organ preservation solution, the KPS-1 solution with a temperature of 4° C., for cold storage.

Figure 2C:
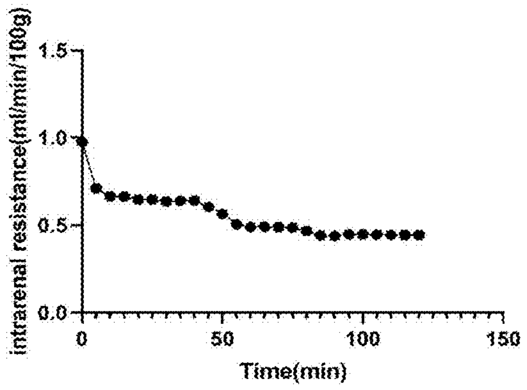

After the kidney was separated from the body of the rat, an organ perfusion pool and a perfusion pipeline were placed in an ice-water bath for hypothermic oxygenated perfusion through renal artery, renal vein and ureter cannulae and by improving the normal-temperature mechanical preservation and re-perfusion system for a kidney of a rat constructed by the previous Patent No. 202020639775.4 from the team. The kidney was placed into a kidney machine perfusion system for perfusion, carbon monoxide-releasing molecules-401 with a concentration of 600 μM were added into an organ preservation solution, a KPS-1 solution, and oxygen was introduced to perform the hypothermic oxygenated perfusion so as to relieve vasospasm and fully perfuse the kidney. The temperature was monitored in real time and controlled to be 0° C. to 4° C., the mean arterial pressure was monitored by a biological information acquisition system and controlled to be 30 mmHg, and after 2 h of the perfusion, perfusion parameters such as pressure, temperature and flow rate were continuously monitored and recorded. The change curves of intrarenal resistance during the perfusion of the hypothermic oxygenated perfusion solution on the kidney in combination with the perfusion of carbon monoxide-releasing molecules-401 at different times after a cardiac death are shown in FIG. 2C.

EXAMPLE 4

SPF healthy male rats from Wistar with the weight of 300-350 g were selected and fasted (water was accessible) for 12 h before the day of operation. After 2% pentobarbital sodium was injected into the abdominal cavity of the rat for anesthesia, the rat was fixed onto an operating table in a supine position during anesthetization, the abdominal hair was removed by a shaver, the operating area was sterilized with iodophor, and a sterile surgical drape was laid. A crisscross incision was made on the abdomen of the rat with a scalpel, then the skin, muscular layer and peritoneum thereof were incised layer-by-layer, the left kidney and the large blood vessels in the abdominal cavity were fully dissociated and exposed, and the surrounding tissues and organs were covered with a gauze soaked in warm saline. The left renal arteries and veins were separated by using cotton swabs and a toothless forceps of a microscope, dissociated and placed to the initial part of left renal arteries and veins, and then the left kidney, the renal arteries, aortae, inferior vena cava and left ureter were dissociated and placed to silk threads for later use in ligation.

The bilateral diaphragm muscles were cut to induce cardiac arrest, the thoracic aorta was ligated to block blood circulation, the abdominal cavity was closed and covered with a sterile wet gauze, and the warm ischemia time was calculated. The renal warm ischemia time was 90 min, and the temperature of the abdominal cavity was maintained at 37° C. by a constant heating pad. At the end of warm ischemia, sterile ice saline was added to the abdominal cavity to rapidly lower the temperature of the abdominal cavity. The abdominal aorta and the inferior vena cava above the left kidney were ligated, then the blood of the left kidney was irrigated through an abdominal aorta cannula by using 8 mL of heparin sodium saline with a temperature of 4° C., a laceration was cut on the inferior vena cava, after the blood flowed out to be clear, 10 mL of organ preservation solution, a KPS-1 solution with a temperature of 4° C., was poured through the abdominal aorta for flushing, and the kidney was fully dissociated, taken out and put into the organ preservation solution, the KPS-1 solution with a temperature of 4° C., for cold storage.

Figure 2D:
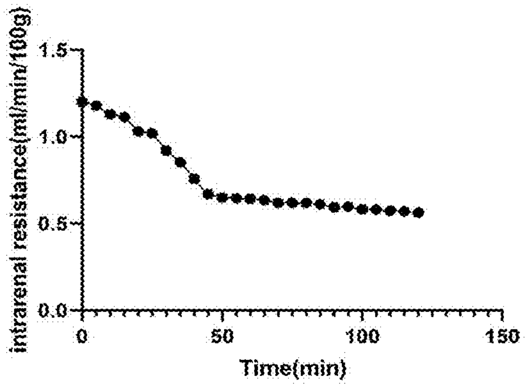
Figure 3A:
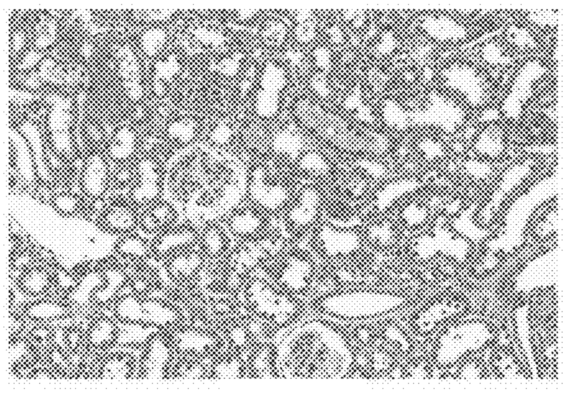
Figure 3B:
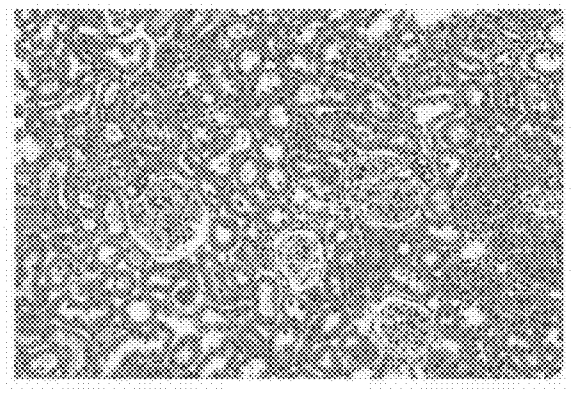
Figure 3C:
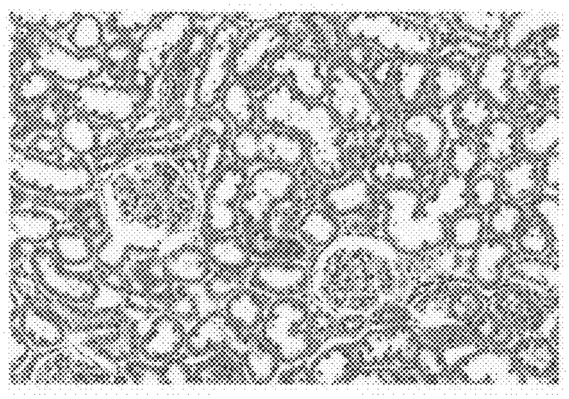
Figure 3D:
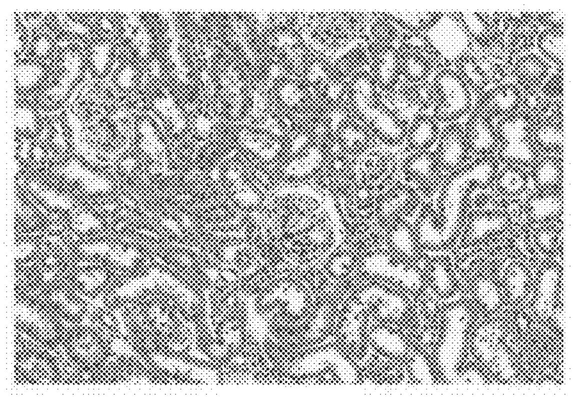

After the kidney was separated from the body of the rat, an organ perfusion pool and a perfusion pipeline were placed in an ice-water bath for hypothermic oxygenated perfusion through renal artery, renal vein and ureter cannulae and by improving the normal-temperature mechanical preservation and re-perfusion system for a kidney of a rat constructed by the previous Patent No. 202020639775.4 from the team. The kidney was placed into a kidney machine perfusion system for perfusion, carbon monoxide-releasing molecules-401 with a concentration of 800 μM were added into an organ preservation solution, a KPS-1 solution, and oxygen was introduced to perform the hypothermic oxygenated perfusion so as to relieve vasospasm and fully perfuse the kidney. The temperature was monitored in real time and controlled to be 0° C. to 4° C., the mean arterial pressure was monitored by a biological information acquisition system and controlled to be 30 mmHg, and after 2 h of the perfusion, perfusion parameters such as pressure, temperature and flow rate were continuously monitored and recorded. The change curves of intrarenal resistance during the perfusion of the hypothermic oxygenated perfusion solution on the kidney in combination with the perfusion of carbon monoxide-releasing molecules-401 at different times after a cardiac death are shown in FIG. 2D.

As shown in FIGS. 2A-2D, after the kidneys from the donation after circulatory death donors in Examples 1~4 were subjected to the hypothermic oxygenated perfusion in combination with carbon monoxide-releasing molecule perfusion treatment, the curves of intrarenal resistance could continuously decrease along with the prolongation of the perfusion time, and the kidneys were maintained in a state of low resistance and stability, which reflected the patency of blood vessels and good perfusion state of the kidneys.

EXAMPLE 5

After 2 h of kidney perfusion according to the methods of Examples 1-4, 1 $cm^3$ of renal tissues were taken out and fixed in neutral formaldehyde for storage, and then dehydrated, embedded in paraffin, sectioned and then stained by H&E, and finally photographed under a microscope to observe morphological changes and pathological analysis of tissues. The specific results are shown in FIGS. 3A-3D.

As shown in FIGS. 3A-3D, the pathological examination results of the kidneys of Examples 1-4 showed that the glomeruli, the renal tubules and the renal interstitium had complete structures, with the normal cell morphology and no obvious abnormality found.

As can be seen from the above examples, the present invention provides a hypothermic oxygenated perfusion solution for repairing kidney injury and use thereof. The ex-vivo repair treatment is performed on a kidney from a donation after circulatory death donor by using the hypothermic oxygenated perfusion solution of the present invention, the vasospasm state of the kidney from the donation after circulatory death donor is regulated, and the vitality of the kidney is recovered during transplantation, which is beneficial to relieving ischemia-reperfusion injury after transplantation, reducing the incidence rate of serious postoperative complications and increasing the number of donor organs. Therefore, the present invention has a definite prospect and value for clinical application. According to the examples of the present invention, the monitoring results of the hypothermic oxygenated perfusion parameters of the donor kidney at different time after a cardiac-death show that the intrarenal resistance is significantly reduced and maintained to be stable under the action of carbon monoxide-releasing molecules, and the perfusion state of the kidney is good; in addition, the histopathological examination results prove that the present invention can effectively protect the normal histological morphology of the kidney and provide a scientific basis for kidney transplantation.

The above descriptions are only preferred embodiments of the present invention. It should be noted that those of ordinary skill in the art can also make several improvements and modifications without departing from the principle of the present invention, and such improvements and modifications shall fall within the protection scope of the present invention.

What is claimed is:

1. A hypothermic oxygenated perfusion solution for repairing kidney injury, wherein the hypothermic oxygenated perfusion solution is a kidney perfusion organ preservation solution carrying carbon monoxide-releasing molecules-401, wherein a final concentration of the carbon monoxide-releasing molecules-401 is 400-800 μM; and wherein oxygen is introduced during machine perfusion at 0° C. to 4° C. to perform hypothermic oxygenated perfusion.

* * * * *